United States Patent [19]

Matson

[11] 4,226,695
[45] Oct. 7, 1980

[54] ELECTROCHEMICAL PROCESSING SYSTEM

[75] Inventor: Wayne R. Matson, Ayer, Mass.

[73] Assignee: Environmental Sciences Associates, Inc., Bedford, Mass.

[21] Appl. No.: 953,335

[22] Filed: Oct. 20, 1978

[51] Int. Cl.$^3$ .................. C02C 5/12; C25C 1/00; C25C 7/02

[52] U.S. Cl. .................. 204/231; 204/130; 204/149; 204/152; 204/228; 204/268

[58] Field of Search ............... 204/149, 152, 268, 228, 204/130

[56] References Cited

U.S. PATENT DOCUMENTS

| 756,328 | 4/1904 | Christy | 204/228 X |
|---|---|---|---|
| 1,292,024 | 1/1919 | Niswonger et al. | 204/268 |
| 1,396,919 | 11/1921 | Brace | 204/228 X |
| 1,428,050 | 9/1922 | Nickum | 204/228 X |
| 1,790,248 | 1/1931 | Roth | 204/268 X |
| 3,332,868 | 7/1967 | Friese et al. | 204/268 X |
| 3,406,103 | 10/1968 | Raetzsch | 204/268 X |

Primary Examiner—Arthur C. Prescott
Attorney, Agent, or Firm—Strimbeck & Soloway

[57] ABSTRACT

An electrochemical processing system is provided. The system comprises an electrochemical cell having a first compartment adapted to contain a first solution, a first counter electrode and a first reference electrode in contact with the first solution, a second compartment adapted to contain a second solution, a second counter electrode and a second reference electrode in contact with the second solution, and a porous bi-polar barrier electrode separating the first and second compartments. The barrier electrode voltage is fixed at ground. By fixing the potential on the first compartment side of the porous barrier electrode at a first potential verses the first reference electrode while the potential on the second compartment side of the porous barrier electrode is maintained at a second (different) potential verses the second reference electrode, the porous barrier electrode can be used as a gate for specific electroactive species. The electrochemical system of the present invention has particular utility in connection with the removal of heavy metals from waste water and sewage and sludge. The system may also be employed to drive synthetic chemical reactions.

19 Claims, 6 Drawing Figures

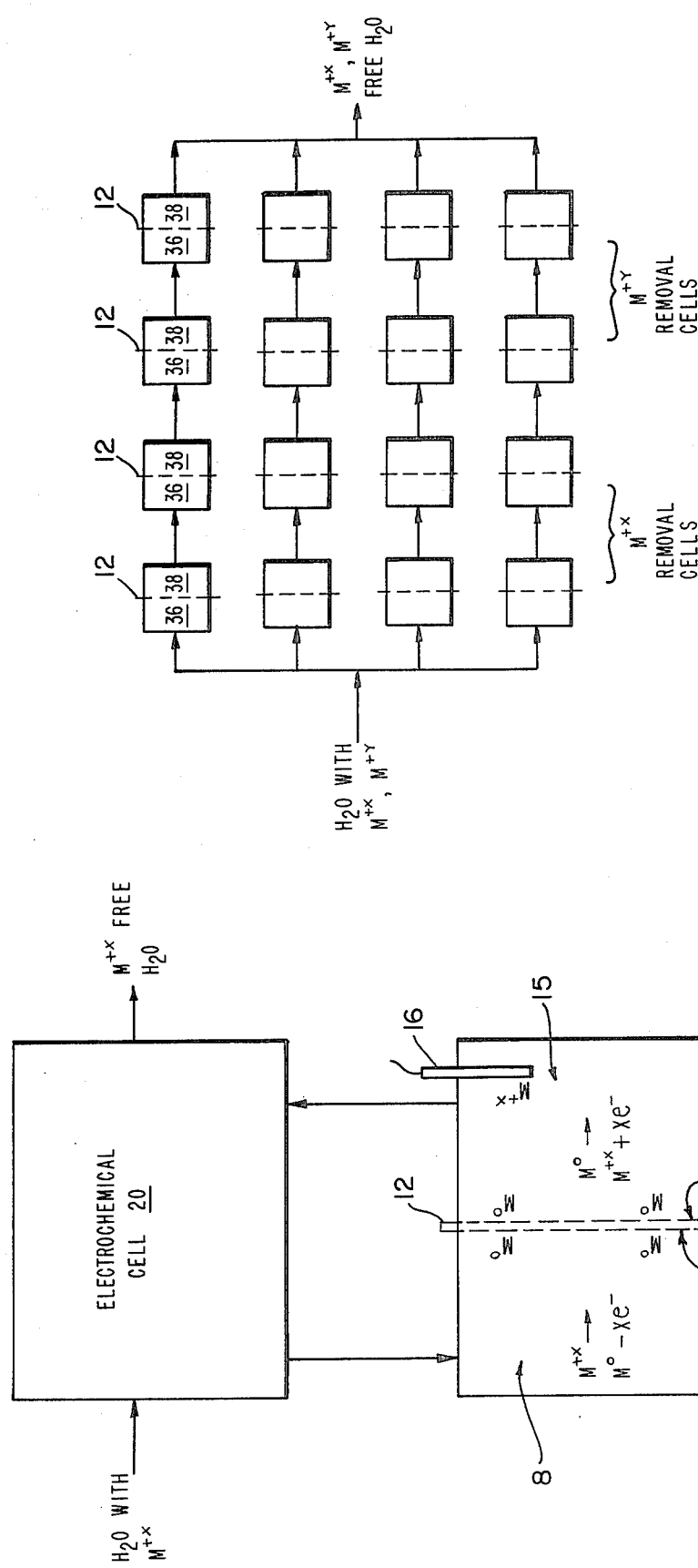

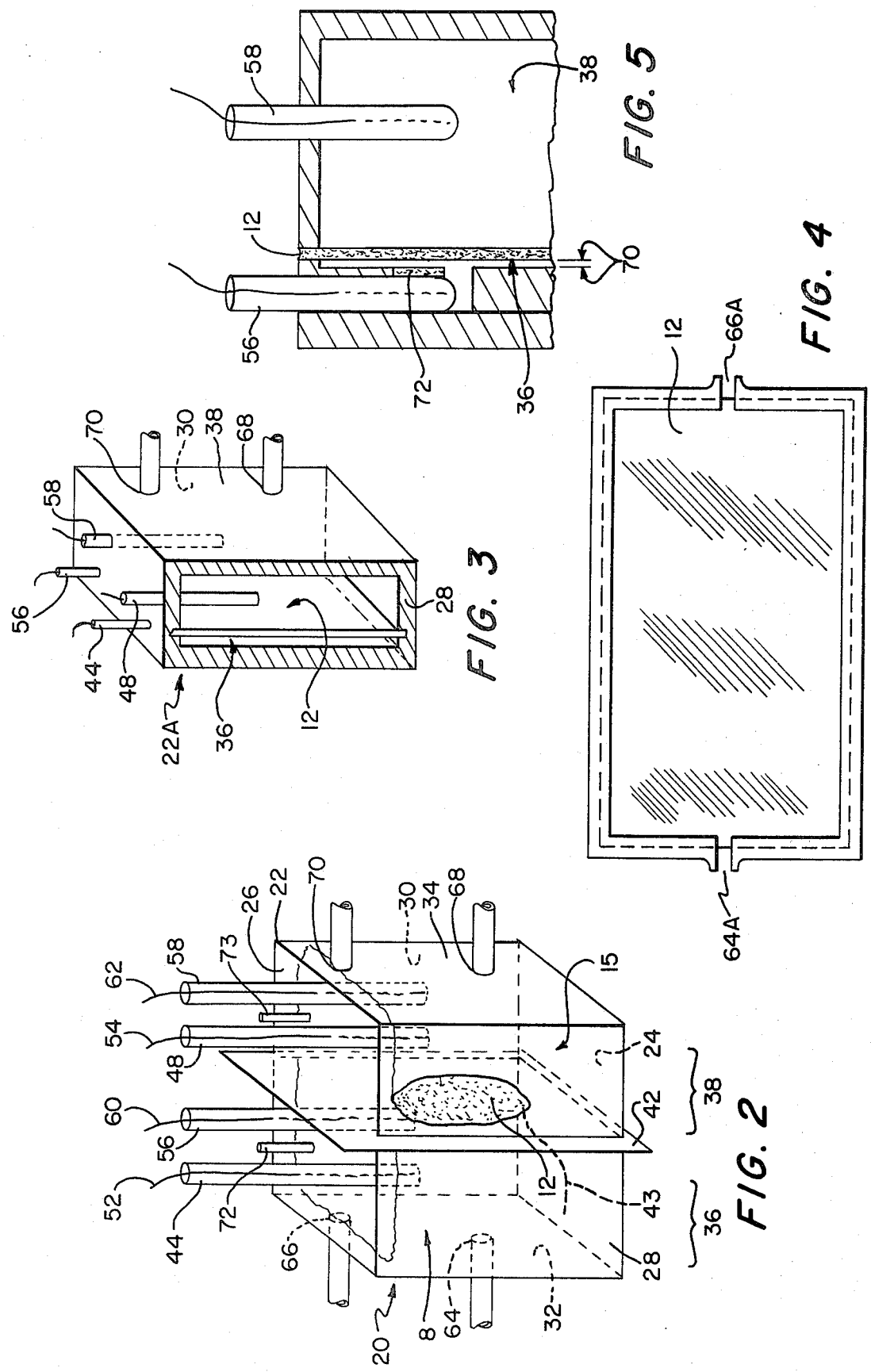

ELECTROCHEMICAL PROCESSING SYSTEM

This invention relates to electrochemical systems, and more particularly to new methods and apparatus for electrochemically processing liquid solutions. The present invention has particular utility in connection with the removal of heavy metals from waste water and sewage and sludge and will be described in connection with such use.

Population growth and industrial development have increased the requirements for fresh water. Parallel with increased requirements for fresh water is an increased danger of ground and underground water pollution, due both to increased quantities of waste waters and sewage and sludge, and to the nature of the pollutants contained in waste waters and sewage and sludge. While certain pollutants can be effectively and relatively economically neutralized in or removed from waste waters and sewage and sludge by chemical and/or mechanical means, or by aeration, the presence of even trace amounts of certain pollutants, for example, metals such as lead, cadmium, chromium, arsenic, nickel, zinc, copper, mercury, and the like, and organic complexes of these and other metals present a serious threat to biological systems. Mercury, for example, is known to be a neuropoison, and is especially dangerous in the alkyl-mercury form often found in water and aquatic life. Cadmium in river water has been identified as the cause of a painful disease (itai itai), while lead and other heavy metals are also known to be dangerous pollutants in waters.

Many heavy metal pollutants are introduced into the water supply from industrial sources such as metal finishing plants, paper mills and from mining. Recent legislative steps to limit the pollution from these sources have been relatively effective. However, some reduced but still significant quantities of heavy metals continue to be introduced into the water supply from industrial sources.

Heavy-metal contamination may also arise naturally. For example, mercury at levels sufficiently high to cause concern has been found in fresh water in lakes where little, if any, human activity is known to have occurred.

Various techniques are known in the art and are currently in use for removing certain heavy metals from industrial waste water and include chemical precipitation, reverse osmosis, ion exchange, and absorption. Such techniques have a number of drawbacks including relatively high cost and relatively elaborate equipment requirements. Moreover, these systems generally are specific for only a few metals; the products from such techniques in turn may present serious waste disposal problems; and, in some instances, merely substitute one undesirable metal ion in place of the metal ion being removed. By way of example, mercury can be removed from water by chemical precipitation or by ion exchange techniques. However, at low mercury concentration, chemical precipitation requires a relatively large quantity of inert carrier solids to achieve efficient separation. This in turn requires handling and disposal of large volumes of precipitate. Ion-exchange generates a mercury-loaded resin which cannot be regenerated and must be disposed of. Furthermore, these techniques in general may not be able to attain the very low effluent metal levels contemplated in prospective government pollution regulations. Moreover, certain heavy metals and metal complexes cannot be satisfactorily removed by known techniques.

Heavy metal contamination may also be found in secondary sewage plant effluent, i.e. so-called "sludge". Heavy metal contamination of sludge is particularly troublesome since sludge so contaminated generally cannot be disposed of on open land, and must be burned. Burning adds considerably to the cost of disposal, and may also result in air pollution.

It is thus a primary object of the present invention to provide a novel electrochemical method and apparatus.

Another object is to provide an improved system, i.e. method and apparatus for removing contaminants from solutions which system overcomes the aforesaid problems of the prior art.

A more specific object is to provide a novel method and apparatus for removing trace and macro quantities of metal ions and metal ion complexes from naturally occurring water, waste water, and sewage plant effluent and sludge.

Other more specific objects are to provide a novel apparatus of the foregoing type which is relatively inexpensive to manufacture and operate, and which is particularly adapted for use in removing contaminants from naturally occuring water, industrial and mining waste water and sewage plant effluent and sludge.

In the following description the term "heavy-metal" is intended to include elemental metal, metal ion, inorganic and organic compounds containing metal, and organic complexes of metal. The terms "water" and "aqueous solution" are intended to include water from natural sources, waste water from a variety of sources including industrial sources and mining operations, raw sewage, secondary sewage and sludge.

Generally, to effect the foregoing and other objects the present invention provides an electrochemical processing system comprising an electrochemical cell having a first compartment adapted to contain a first solution, a first counter electrode and a first reference electrode in contact with the first solution, a second compartment adapted to contain a second solution, a second counter electrode and a second reference electrode in contact with the second solution, and a porous grounded bipolar barrier electrode separating the first and second compartments. The barrier electrode voltage is fixed at ground. The potential on the first compartment side of the porous barrier electrode is maintained at a first potential verses the first reference electrode while the potential on the second compartment side of the porous barrier electrode is maintained at a second (different) potential verses the second reference electrode. As one skilled in the art knows, an electrode may be fixed at only one electronic voltage; however, it can have a plurality of electrochemical potentials. The present invention regulates the electrochemical potentials on the porous barrier electrode so that that electrode can be used as a gate for specific electroactive species. For example, for removing metal ions from solution the solution is introduced into the cell first compartment and the potential on the first compartment side of the porous electrode is fixed at a negative potential. The following reaction occurs:

$$M^{+x} \rightarrow M^o - xe^- \qquad (I)$$

Thus, metal ions in solution in the first compartment will be stripped out of solution and deposited as metal on the first compartment side of the porous barrier electrode. These reaction products, i.e. the deposited metal then pass through the porous barrier electrode onto the second compartment side of the porous barrier electrode where the metal then undergoes reaction dependent on the solution in the second compartment and the electrical potential therein. For example in the illustrated case the potential on the second compartment side of the porous electrode is fixed at a positive potential, or zero. The metal undergoes the following reaction in the second compartment:

$$M^o \rightarrow M^{+x} + xe^{31} \quad (II)$$

Thus metal on the second compartment side of the porous barrier electrode is stripped from the porous electrode as ions which go into solution in the second compartment. Once in solution as ions in the second compartment the metal may then be collected on an electrode, and the collected metal can then be reclaimed or safely disposed of. In a preferred embodiment of the invention the first compartment includes an inlet and an outlet and is adapted for continuous throughput of solution.

For a fuller understanding of the nature and objects of the present invention, reference should be had to the following detailed description taken in connection with the accompanying drawings wherein like numerals denote like elements, and:

FIG. 1 is a flow diagram illustrating the electrochemical process according to the present invention;

FIG. 2 is a perspective view, in cross-section, illustrating one form of electrochemical cell for use in a batch-type process in accordance with one embodiment of the present invention;

FIG. 3 is a perspective view, in cross-section, illustrating another form of electrochemical cell for use in a continuous process in accordance with a preferred embodiment of the present invention;

FIG. 4 is a side view, in cross-section of the electrochemical cell of FIG. 3;

FIG. 5 is an end view, in cross-section of the electrochemical cell of FIG. 3; and FIG. 6 is a flow diagram illustrating a typical form of electrochemical processing system according to the present invention.

One embodiment of the electrochemical process of the present invention is shown in FIG. 1 and will be described as a batch-type process using the electrochemical cell as shown in FIG. 2. The process shown involves four main steps: (1) the stripping of metal ions from a first solution 8 containing the metal, and deposition thereof as metal on the negative potential surface 10 of a grounded porous barrier electrode 12; (2) diffusion of deposited metal through the porous barrier electrode to the positive potential surface 14 of electrode 12; (3) stripping of the diffused metal from electrode surface 14 as ions into a second (i.e. receptor) solution 15, and (4) electrodeposition of the metal ions from the second solution 15 onto an electrode 16. Steps (1) to (4) are carried out in a single electrochemical cell.

FIG. 2 shows an electrochemical cell usable to perform the process of FIG. 1. The cell, indicated generally as 20, comprises a hollow, liquid-tight enclosure 22 having horizontal bottom and top walls 24 and 26, respectively, vertical side walls 28 and 30, and vertical end walls 32 and 34. All the walls are formed of a material which is inert to and unaffected by the solutions contained in the cell as will be described in detail hereinafter. Disposed within enclosure 22 extending between and fixed to bottom and top walls 24 and 26 and side walls 28 and 30 is a liquid-tight, porous barrier electrode 12 which divides cell 20 into a first compartment 36 and a second compartment 38. Electrode 12 should be formed of a porous electrically conductive material such as expanded mesh metal sheet; alternatively electrode 12 may comprise a foamed conductive material such as porous graphite, a conductive material such as mercury supported on a non-conductive material, or a foamed non-conductive material such as porous ceramic or plastic impregnated with a conductor material such as mercury. Pore size may vary over a wide range depending on the material to be treated. Generally, for removing heavy metal ions from aqueous solution electrode 12 should be formed of a material which has a pore size of between about 0.05 microns and 2.0 microns and a thickness of between about 0.1 mm and 2.0 mm. Electrically conductive porous materials which satisfy the foregoing criteria are known in the art and are available commercially. Suitable materials are Poco Graphite XA3 filters (the latter can be impregnated with mercury following procedures well known in the art. Poco Graphite filter material is available from Poco Graphite a subsidiary of Union 76 Oil Co. under the tradename "Grafilters"); and, "Foammetal", nickel or copper (the latter is available from Foammetal, Inc.; the manufacturer describes this material as porous expanded metal).

Electrode 12 may be self-supporting, or it may be supported on a perforated supported member 42 as shown in FIG. 2. Electrode 12 is electrically connected to ground via a line 43. Optionally, but not necessarily, electrode 12 will comprise porous graphite bodies impregnated with mercury, for example as described in U.S. Pat. No. 3,855,099, issued Dec. 17, 1974 to Wayne R. Matson. Analytical electrodes of this type are available commercially from Environmental Sciences Associates, Inc., Bedford, Massachusetts, USA.

A first reference electrode 44 is disposed within the interior of compartment 36, spaced from electrode 12. A second reference electrode 48 is disposed within the interior of compartment 38, spaced from electrode 12. Reference electrodes 44 and 48 are of conventional construction and may comprise for example, Ag/AgCl electrodes or saturated calomel electrodes. Electrodes 44 and 48 are connected via electrically conductive leads 52 and 54, respectively, to an external voltage source (not shown).

A first counter electrode 56 is disposed within the interior of compartment 36, spaced from electrode 12 and reference electrode 44. A second counter electrode 58 is disposed within the interior of compartment 38, spaced from electrode 12 and reference electrode 48. Electrodes 56 and 58 may also be formed of a variety of materials, depending upon the nature of the solution to be treated. Typically, but not necessarily, the counter electrodes are of an inert conductive material such as carbon, graphite, tungsten, platinum, or platinum coated graphite. Electrodes 56 and 58 are connected via electrically conductive leads 60 and 62, respectively, to an external voltage source (not shown).

Completing electrochemical cell 20 are inlet and outlet ports 64 and 66, respectively, in wall 32, for charging first compartment 36 with the solution to be treated; inlet and outlet ports 68 and 70, respectively in wall 34 for charging second compartment 38 with a second, i.e. receptor solution; and, gas vents 72 and 73 in top wall 26 for venting compartments 36 and 38. As will become clear from the description following reference electrode 44 and counter electrode 56 are electrically coupled to surface 10 of electrode 12 by solution 8, while reference electrode 46 and counter electrode 58 are electrically coupled to surface 14 of electrode 12 by solution 15.

In use, the solution to be treated, e.g. waste water containing a heavy metal, is charged to compartment 36. A second solution such as inorganic saline solution is charged to compartment 38 as receptor solution. A relatively high negative potential, e.g. $-1.0$ to $-2.0$ V verses Ag/AgCl is established on side 10 of electrode 12, while a positive potential, e.g. $+0.05$ V verses Ag/AgCl is established on the other side of electrode 12.

The negative potential on side 10 of electrode 12 causes heavy metal ions in solution 8 to be deposited out as metal on surface 10 of electrode 12. The deposited metal then passes through electrode 10 to surface 14. There the heavy metal ions are stripped off surface 14, pass into solution 15 and are then deposited onto electrode 58.

The preferred embodiment of the invention is illustrated in FIGS. 3-5, and is adapted for continuous throughput operation. It is to be noted that numerals used in FIGS. 1 and 2 are used to designate the same equipment in FIGS. 3-5, except as otherwise stated hereinafter.

Turning to FIGS. 3-5, the electrochemical cell comprises a liquid-tight enclosure 22A as before, divided into a first compartment 36 and an second compartment 38 by a porous, bi-polar, grounded barrier electrode 12. As before, the cell also includes a pair of reference electrodes 44 and 48, and a pair of counter electrodes 56 and 58 disposed, one of each pair in compartment 36 and compartment 38, respectively. The FIGS. 3-5 embodiment also includes inlet and outlet ports 64A and 66A, respectively, for supplying compartment 36 with solution 8 to be treated; however, in the FIGS. 3-5 preferred embodiment ports 64A and 66A are mounted one each in the cell side walls 28 and 30 so that solution 8 may be continuously flowed through the compartment 36. Desirably, and in order to promote thin layer contact with barrier electrode 12 compartment 36 will be dimensioned so as to define a shallow flow channel 70 (see FIG. 5). Also, barrier electrode 12 should be made as large as possible in plan area. Thus, as seen in FIGS. 4 and 5 electrode 12 is self-supporting and constitutes substantially the entire barrier betwen compartments 36 and 38. Also if desired, more than one counter electrode may be included in the compartments 36 and 38. As before, the reference and counter electrodes in each compartment and barrier electrode 12 must be separated from one another. Insuring electrode separation in compartment 38 can be attained by suitable geometry. On the other hand, in order to assure that the electrodes in compartment 36 remain separated porous spacers or insulators (only one of which 72 is shown) can be positioned between the electrodes.

Further understanding of the principles and advantages of the present invention may be had by reference to the following Examples which are based upon the removal of selected heavy metal ions from a sample solution containing same. In the examples, an electrolytic cell made in accordance with FIGS. 1 and 2 was used. The cell had an interior space of approximately 20 mm×50 mm×100 mm which was divided into two substantially equal sized compartments by a porous barrier electrode 12. The barrier electrode comprised Poco Graphite XA3 porous filter material, 0.1 cm thick, and had an effective area of approximately 5000 cm.

The basic procedure was to dissolve small amounts of a heavy metal and a control metal in nitric acid, and add the acid to 0.1 F NaCl aqueous solution to form the first solution 8. The second solution 15 was 0.1 F NaCl aqueous solution. The first compartment 36 was filled with solution 8, and the second compartment 38 was filled with solution 15. Negative electrical potential was established on the side of the barrier electrode 12 in the first compartment 36, while a positive potential was established on the side of the barrier electrode 12 in the second compartment 38. The cell was run for one hour, shut down, and the solution in the second compartment was then analyzed using known techniques.

EXAMPLE I

A sample solution was prepared by dissolving 100 ppm each of lead ion and cadmium ion in 0.1 F NaCl aqueous solution. The sample solution was charged to compartment 36. Electrode 56 was fixed at a potential of $-0.8$ V relative to reference electrode 44, and electrode 58 was fixed at a potential of $+0.05$ V relative to electrode 48. The cell was run for one hour.

RESULTS

The electrolyte in the compartment 38 was analyzed using conventional techniques, and was found to contain 60 ppm lead, and 0.01 ppm cadmium.

CONCLUSIONS

Lead ions were actively transferred from the solution in compartment 36 to the solution in compartment 38. The slight amount of cadmium found in the compartment 38 was attributed to diffusion of the cadmium across the barrier electrode 12.

EXAMPLE II

The purpose of this Example is to see if stirring improves the rate of transfer of lead from the compartment 36 to compartment 38. The procedure of Example I was followed except that the cell was run for 10 minute intervals. The solution in cell compartment 36 was mechanically stirred during intervals; and, the electrolyte in the compartment 36 was analyzed and results noted.

RESULTS

Stirring substantially increases the rate at which lead is transferred from the solution in compartment 36 to solution in compartment 38.

EXAMPLES III-V

The purpose of these Examples is to show how other metals may be removed from sample solutions in accordance with the present invention. Sample solutions were prepared and charged to the compartment 36 of the electrochemical cell as in Example I. Electrical potentials were fixed as indicated below:

| Example No. | Electrode 56 Potential Volts (Relative To Electrode 44) | Electrode 58 Potential Volts (Relative To Electrode 48) | Heavy Metal | Compartment 36 Heavy Metal Content (ppm) Initially | Compartment 38 Heavy Metal Content (ppm) Ending |
| --- | --- | --- | --- | --- | --- |
| III | −1.2 | +0.05 | Cd, Pb | 100 ppm Cd 100 ppm Pb | 60 ppm Cd 45 ppm Pb |
| IV | −1.2 | −0.600 | Cd, Pb | 100 ppm Cd 100 ppm Pb | 60 ppm Cd 1.1 ppm Pb |
| V | −0.6 | +.080 | Cd, Pb, Bi | all 100 ppm | 1.0 ppm Cd 4.0 ppm Pb 30 ppm Bi |

As should be clear from the foregoing the present invention offers a novel method and apparatus for removing trace amounts of metal contaminants from aqueous solution. Moreover, the invention is susceptible to modification. Thus, for example as shown schematically in FIG. 6, two or more different metals can be removed from solution by passing the solution successively through a number of cells, each of which cells is set to operate at a potential most favoring the transfer across electrode 12 of a selected metal. Moreover, the solution may be cascaded from one cell to another like cell in series in order to increase the effectiveness of the removal. By way of example, continuous operation may be achieved using a flow cell of the type illustrated in FIGS. 3-5. In this regard it has been determined that a suprising few number of relatively small cells made in accordance with the present invention are quite effective for treating a relatively large quantity of solution. As is well known the cell time constant (K) for a continuously flowing stream is defined by $$K = e(V\delta/AD)$$

where
- $e =$ the base of Naperian logarithm 2.7
- $V =$ cell volume
- $\delta =$ Nernst layer $10\mu$, $10^{-3}$ cm
- $A =$ electrode area, and
- $D =$ diffusion constant Thus, for a cell constructed as shown in FIGS. 3-5 in which compartment 36 has a volume of 500 ml barrier electrode 12 has an area of 5000 cm², and a diffusion constant of $10^{-5}$ cm²/sec., the cell time constant K will be approximately 27 seconds.

Thus for a 1 meter long section of cell the concentration of trace metals contained in a stream flowing at 500 ml/27 sec. will be reduced by $1-(1/e)$ or 63%. Therefore a series of four 1 meter cell sections would reduce the concentration at the 500 ml/27 sec. (1 liter/min) flow rate by $1 - (1/e_4)$ or 98%.

Cascading the solution being treated from one cell to another permits removal of undesirable reaction products which may be introduced by and/or pass through upstream cells. For example, for removing heavy metal pollutants such as lead, cadmium and zinc from aqueous solution, a preferred material for forming the porous barrier electrode in accordance with the present invention comprises mercury impregnated graphite. However, these cells obviously cannot remove mercury pollutants and may actually contribute elemental mercury and/or reaction products of mercury such as mercury ion and organo mercurials to the solution being treated. Thus, the final, i.e. downstream cell may be designed specifically to remove mercury and reaction products of mercury. In this regard, an effective porous barrier electrode comprises gold film carried on a porous graphite filter support.

One skilled in the art will recognize that the invention as above described is susceptible to modification. For example, anionic-type contaminants such as cyanide ion could be removed from aqueous solution using the process and apparatus of the present invention by reversing the electrical potentials in the cell compartments.

Moreover certain undesirable and harmful organic contaminants may be forced to undergo reaction and can them be removed in cell 20 as less troublesome materials. For example, Chlordane could be decomposed and removed. A particular feature and advantage of the present invention is that the electrochemical cell may also be employed to drive synthetic chemical reactions. By way of example, methanol could be oxidized to yield a higher concentration of aldehyde or formic acid by control of the solutions in compartments 36 and 38 and the potentials on electrode 20.

Moreover, the electrochemical cell may be employed with both aqueous and non-aqueous systems. By way of example, compartments 36 and 38 could be charged with aqueous solutions, while the porous barrier electrode could be saturated with a non-aqueous, water immiscible liquid. The non-aqueous immiscible liquid should remain within the porous barrier electrode as an immobile phase. Thus, if a water immiscible reaction product is produced at one side of the porous barrier electrode, that product could pass through the barrier electrode in the immiscible phase and could then be forced to undergo a desired reaction at the other side of the porous barrier electrode. One skilled in the art will recognize that this type of arrangement has the added feature that an electromotive driving force may be produced across the porous barrier electrode.

Further with respect to the modification of the invention, ion exchange or chelating membranes may be fused into surface 10 of electrode 12 to improve the scavenging ability of the system, particularly where metal organic complexes may exist in the liquid being treated. Also several cells may be connected in parallel or series so that one or more cells may be shut down periodically for replacement of electrodes, etc., while the remaining cells are left on-line, thus permitting continuous operation. Moreover, the potentials established on either side of the porous barrier electrode need not be held constant. In fact, periodically varying the potentials, e.g. by imposing a pulse ramp or other suitable wave form provides an advantageous means for cleaning contaminants, etc. from the barrier electrodes. Obviously, care must be taken to safely dispose of the products of the cleaning. Furthermore, various conventional means may be employed for stirring the solutions to improve the rate of mass transport. In this regard cells in which the porous barrier electrode is formed of a flexible material also offer several interesting and unique possibilities for stirring the solutions. For example, stirring may be accomplished sonically, e.g. by driving the solutions with a vibrating transducer of controlled amplitude and frequency. Another possibility is to employ pulsed hydraulics, for example, with intermittent valving or via a driving piston.

Still other changes and advantages will be obvious to one skilled in the art.

What is claimed is:

1. An electrochemical cell comprising:
   a first compartment for containing a first solution;
   a first counter electrode and a first reference electrode disposed in said first compartment for contacting said first solution;
   a second compartment for containing a second solution;
   a second counter electrode and a second reference electrode disposed in said second compartment for contacting said second solution;
   a porous, bi-polar barrier electrode separating said first and said second compartments, and electrically connected to ground;
   means for applying a potential on the first compartment side of said porous, bi-polar barrier electrode at a first value; and
   means for applying a potential on the second compartment side of said porous bi-polar barrier electrode at a second value.

2. An electrochemical cell according to claim 1 and including a first inlet and a first outlet means for introducing said first solution into said first compartment, and a second inlet and a second outlet for introducing said second solution into said second compartment, the said porous, bi-polar barrier electrode being essentially liquid tight and preventing any appreciable intermixing of said first and second solutions.

3. An electrochemical cell according to claim 2 wherein said first inlet and said first outlet are adapted for continuous through-put of said first solution.

4. An electrochemical cell according to claim 1 wherein said porous, bi-polar barrier electrode comprises a porous, electrically conductive material.

5. An electrochemical cell according to claim 4 wherein said porous, electrically conductive material is selected from the group consisting of expanded mesh metal sheet, porous conductive material and a conductor material supported on a porous non-conductive material.

6. An electrochemical cell according to claim 4 wherein said porous, bi-polar barrier electrode comprises mercury-impregnated porous graphite.

7. An electrochemical cell according to claim 4 wherein said porous, bi-polar barrier electrode comprises gold film-coated porous graphite.

8. An electrochemical cell according to claim 4 wherein said porous, bi-polar barrier electrode has a pore size in the range of between about 0.05 microns and 2.0 microns.

9. An electrochemical cell according to claim 4 wherein said porous, bi-polar barrier electrode has a thickness in the range of between about 0.1 mm and 2.0 mm.

10. An electrochemical cell according to claim 1 and including a plurality of said first counter electrodes in said first compartment.

11. An electrochemical cell according to claim 1 and including a plurality of said second counter electrodes in said second compartment.

12. An electrochemical cell according to claim 1 and including a first aqueous solution in said first compartment, and a second aqueous solution in said second compartment.

13. An electrochemical cell according to claim 1 and further including a non-aqueous immiscible liquid contained within said porous, bi-polar barrier electrode.

14. An electrochemical cell according to claim 1 wherein said first value comprises a negative potential, and said second value comprises a value more positive than said first potential.

15. An electrochemical cell according to claim 14 wherein said second potential comprises a positive potential.

16. An electrochemical cell according to claim 14 wherein said second potential is zero.

17. An electrochemical cell according to claim 1 and including an ion exhange or chelating membrane in contact with said porous, bi-polar barrier electrode.

18. An electrochemical system comprising a plurality of electrochemical cells as claimed in claim 1, connected in series.

19. An electrochemical system comprising a plurality of electrochemical cells as claimed in claim 1, connected in parallel.

* * * * *